US010669466B2

(12) United States Patent
Miyashita

(10) Patent No.: US 10,669,466 B2
(45) Date of Patent: Jun. 2, 2020

(54) COLD-STORAGE AGENT, REFRIGERATED CONTAINER, AND METHOD FOR REFRIGERATED TRANSPORTATION

(71) Applicant: JAPAN COLD CHAIN CO., LTD., Tokyo (JP)

(72) Inventor: Hirokazu Miyashita, Tokyo (JP)

(73) Assignee: JAPAN COLD CHAIN CO., LTD, Tokyo (JP)

( * ) Notice: Subject to any disclaimer, the term of this patent is extended or adjusted under 35 U.S.C. 154(b) by 120 days.

(21) Appl. No.: 16/076,953

(22) PCT Filed: Aug. 29, 2016

(86) PCT No.: PCT/JP2016/075247
§ 371 (c)(1),
(2) Date: Aug. 9, 2018

(87) PCT Pub. No.: WO2017/138177
PCT Pub. Date: Aug. 17, 2017

(65) Prior Publication Data
US 2019/0112514 A1   Apr. 18, 2019

(30) Foreign Application Priority Data

Feb. 12, 2016 (JP) ................................. 2016-025243

(51) Int. Cl.
C09K 5/06 (2006.01)
F25D 3/08 (2006.01)
(Continued)

(52) U.S. Cl.
CPC .............. C09K 5/066 (2013.01); F25B 45/00 (2013.01); F25D 3/08 (2013.01); F25D 5/02 (2013.01);
(Continued)

(58) Field of Classification Search
CPC ... C09K 5/066; F25D 3/08; F25D 5/02; F25D 2303/0822; F25D 2303/085; F25B 45/00
See application file for complete search history.

(56) References Cited

U.S. PATENT DOCUMENTS 4,689,164 A    8/1987  Ames
6,020,113 A *  2/2000  Abe ........................ G03C 5/264
                                                           430/458
(Continued)

FOREIGN PATENT DOCUMENTS

JP    1980-161879 A    12/1980
JP    1981-008482 A     1/1981
(Continued)

OTHER PUBLICATIONS

English Translation of International Search Report from PCT/2016/075247 dated Oct. 18, 2016 (2 pages).

Primary Examiner — Kun Kai Ma
(74) Attorney, Agent, or Firm — Calfee, Halter & Griswold LLP

(57) ABSTRACT

Provided is a cold-storage agent freezing at a temperature range of a freezer in a household refrigerator and excellent in cooling retaining performance.

In a cold-storage agent including: water; ammonium chloride; potassium chloride; and sodium sulfate, content of the ammonium chloride, the potassium chloride, and the sodium sulfate satisfies the following Formula (1):

$$1.0 < \text{ammonium chloride}/(\text{potassium chloride}+\text{sodium sulfate}) < 5.0 \quad \text{Formula (1)}$$

13 Claims, 7 Drawing Sheets

(51) Int. Cl.
*F25B 45/00* (2006.01)
*F25D 5/02* (2006.01)

(52) U.S. Cl.
CPC ............... *F25D 2303/085* (2013.01); *F25D 2303/0822* (2013.01)

(56) References Cited

U.S. PATENT DOCUMENTS

| | | | |
|---|---|---|---|
| 2004/0044166 A1* | 3/2004 | Rozhanskii | C07C 309/73 528/86 |
| 2009/0214628 A1* | 8/2009 | de Rijk | A61K 8/60 424/450 |
| 2019/0055492 A1* | 2/2019 | Takabatake | A23D 9/02 |

FOREIGN PATENT DOCUMENTS

| | | |
|---|---|---|
| JP | 1994-080959 A | 3/1994 |
| JP | 2002-129151 A | 5/2002 |
| JP | 2002-371269 A | 12/2002 |
| JP | 2008-156582 | 7/2008 |
| WO | 2014/050157 | 4/2014 |

* cited by examiner

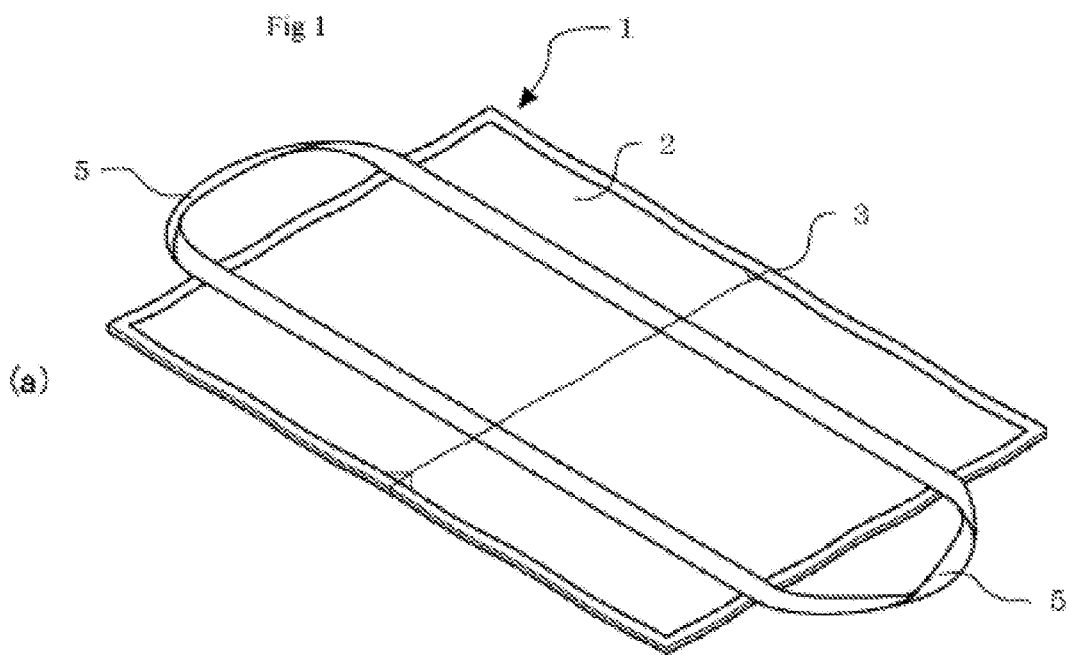
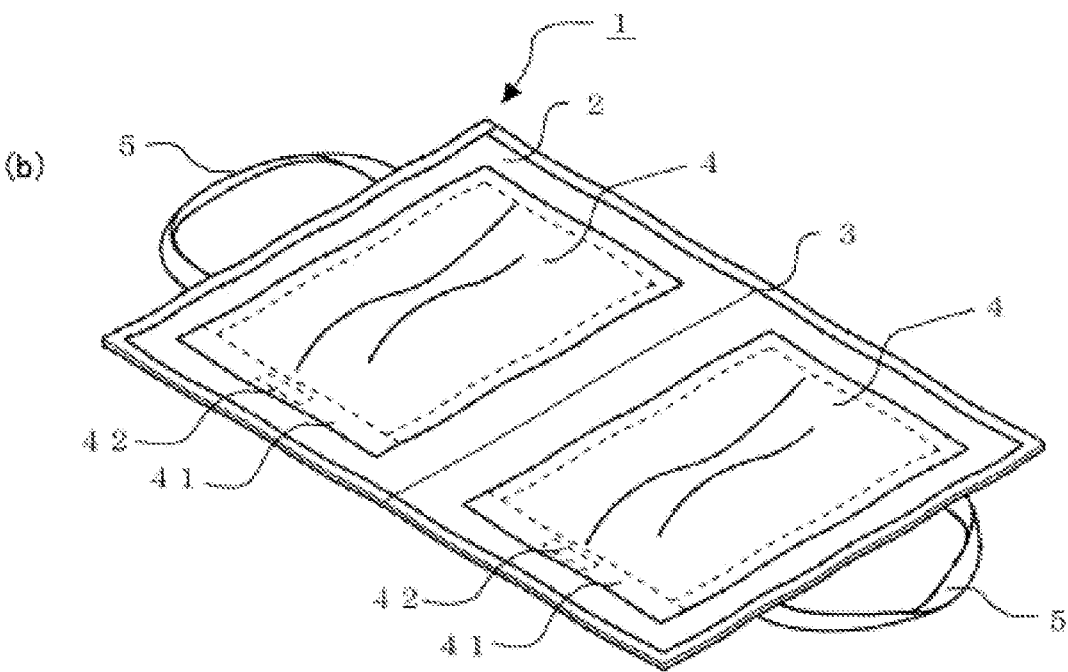

Fig 2
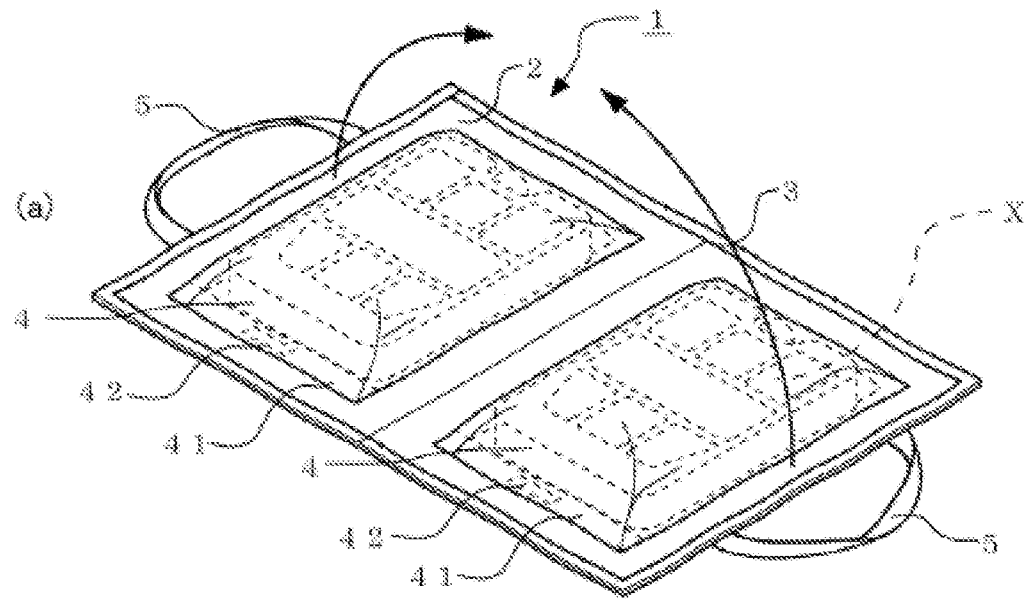
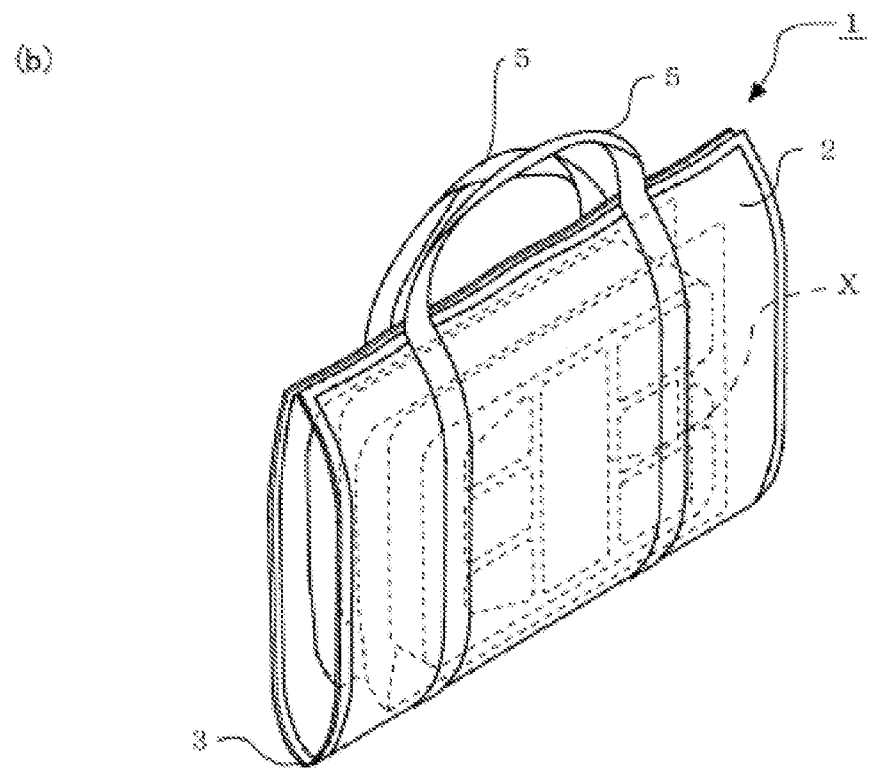

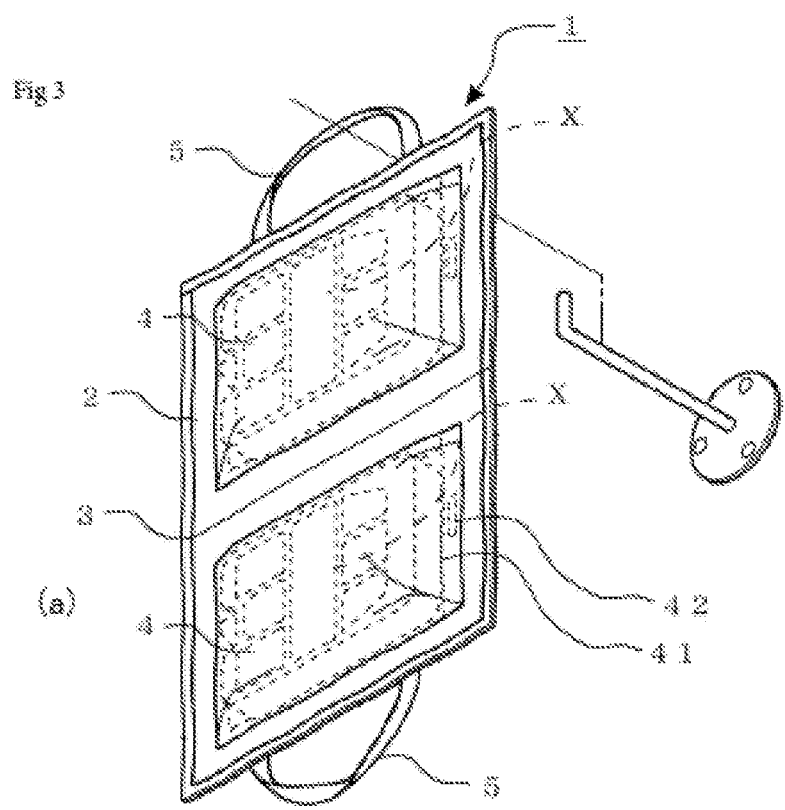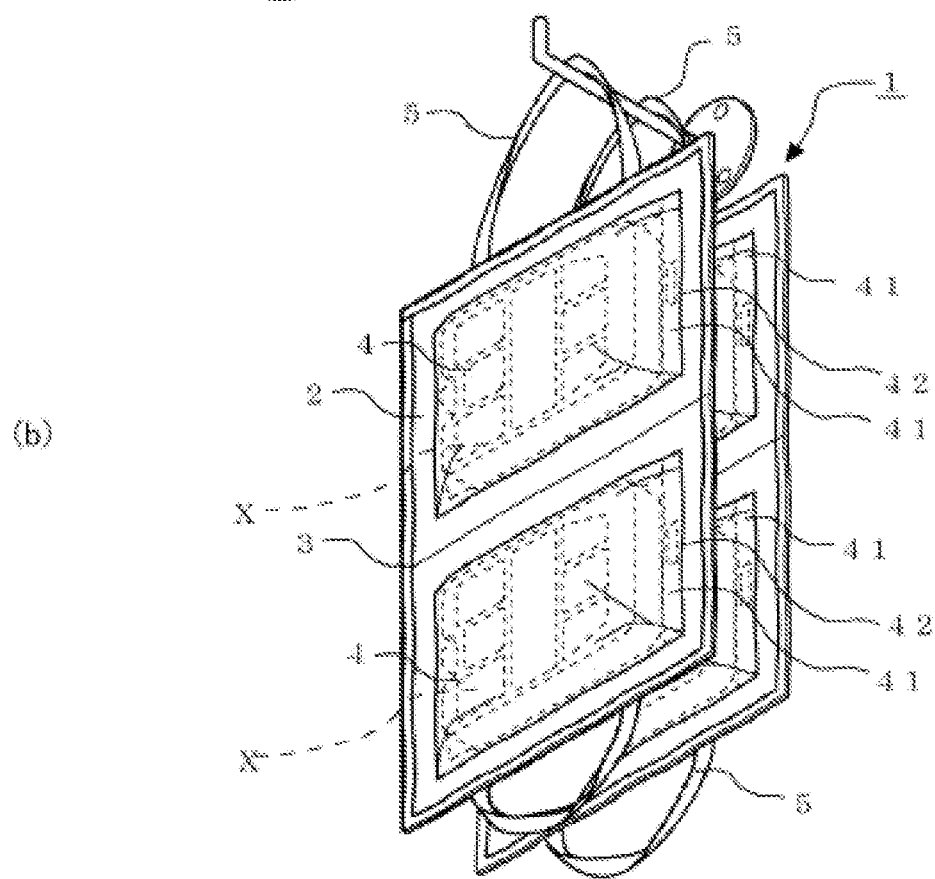
Fig 3

COLD-STORAGE AGENT, REFRIGERATED CONTAINER, AND METHOD FOR REFRIGERATED TRANSPORTATION

CROSS-REFERENCE TO RELATED APPLICATIONS

This application is a 371 of PCT Application No. PCT/JP2016/075247 filed on Aug. 29, 2016, which claim priority to Japanese Application No. 2016-025243 filed on Feb. 12, 2016, the contents of which are hereby incorporated by reference as if recited in their entirety.

TECHNICAL FIELD

The present invention relates to a cold-storage agent. The present invention specifically relates to a cold-storage agent retaining a temperature range around −18° C., which temperature is a general condition for preserving frozen foods.

The present invention also relates to a refrigerated container keeping a refrigerated target at an appropriate refrigeration temperature.

The present invention further relates to a method for refrigerated transportation transporting a refrigerated target while keeping a refrigerated state.

BACKGROUND ART

Conventionally known is a refrigerant packaging an aqueous solution of potassium chloride, ammonium chloride, and the like as a cold-storage agent (Patent Literature 1 and Patent Literature 2).

Also, in a case of using a refrigerant to preserve a frozen food, the refrigerant is in a form of a packaged refrigerant packaged in a plastic package (Patent Literature 3). Currently, a refrigerated container using ice, dry ice, or a pump is the mainstream. Also, in a case of transporting a refrigerated target such as a food in a current refrigerated transportation field site, an equipped cooling device cools the entirety inside a truck to retain a refrigerating temperature for a food or the like and transport the food or the like.

CITATION LIST

Patent Literature

Patent Literature 1: JP 2002-371269 A
Patent Literature 2: JP 2002-129151 A
Patent Literature 3: JP 2008-156582 A

SUMMARY OF INVENTION

Technical Problem

The performance of a cold-storage agent as a refrigerant can be evaluated by the relationship between a cooling temperature and retention time thereof. The temperature of a freezer in a household refrigerator is normally set to −22 to −18° C. Thus, an object of the present invention is to extend the retention time at a temperature close to the temperature range for preservation of a food.

On the other hand, since a cold-storage agent using a metal salt aqueous solution as a cold-storage medium has a problem of supercooling, such a cold-storage agent has a problem in which a facility is limited for use to freeze the cold-storage agent. Under such circumstances, another object of the present invention is to freeze the cold-storage agent at a relatively high temperature (preferably within −3° C. of the targeted temperature range) for use.

Also, the refrigerated container using ice is in a temperature range of 0° C. while the refrigerated container using dry ice is in a temperature range of −78.5° C. For preservation of a food, a temperature close to −22 to −18° C. is required to be retained, and the refrigerated container using ice or dry ice is not thus suitable for the purpose. The refrigerated container using a pump for refrigeration requires a space for installing a cooling device in the refrigerated container and thus has a poor containing efficiency for the refrigerated target. In addition, since the refrigerated container using a pump for refrigeration uses a large amount of electric power, there is concern for an influence on the environment.

Also, in the conventional transportation method, the entirety inside the truck is cooled even in a case of transporting a food the capacity of which is half of the capacity of the truck, for example. This is regarded as being problematic in terms of the cost, the transportation efficiency, and the influence on the environment. Also, since a truck equipped with no cooling device cannot transport a product requiring refrigeration for a long time, carriers are limited to ones that can transport the refrigerated target.

In consideration of the above circumstances, a second object of the present invention is to provide a refrigerated container enabling a long-time refrigerating effect to be maintained.

Also, a third object of the present invention is to provide a transportation method enabling refrigerated targets having different refrigerating temperatures to be mounted in an same space and be transported for a long time.

Solution to Problem

To solve the above problem, the present invention is as follows.

A cold-storage agent including: water; ammonium chloride; potassium chloride; and sodium sulfate,
wherein content of the ammonium chloride, the potassium chloride, and the sodium sulfate satisfies the following Formula (1):

$$1.0 < \text{ammonium chloride}/(\text{potassium chloride} + \text{sodium sulfate}) < 5.0 \quad \text{Formula (1)}$$

In a preferred embodiment, the content of the ammonium chloride is 10.0 to 30.0 mass %.

In a preferred embodiment, total content of the potassium chloride and the sodium sulfate is 5.0 to 20.0 mass %.

Further, according to the present invention, there is also provided a packaged refrigerant including: the cold-storage agent according to the present invention; and a package packaging the cold-storage agent.

Furthermore, the present invention also provides a refrigerated container adapted to keep a refrigerated target at an appropriate refrigerating temperature, the refrigerated container including: a refrigerated container main body having a heat-insulating property; and the packaged refrigerant contained in the refrigerated container main body.

In a preferred embodiment of the refrigerated container according to the present invention, the refrigerated container main body includes on an inner surface thereof a refrigerant holding portion adapted to hold the packaged refrigerant.

Since the refrigerated container main body includes on the inner surface thereof the refrigerant holding portion adapted to hold the packaged refrigerant, the packaged refrigerant can be held, and the refrigerant can be prevented from moving due to inclination of the refrigerated container.

In a preferred embodiment of the refrigerated container according to the present invention, the refrigerated container main body includes a heat-insulating sheet covering an upper surface of the refrigerated target.

Since the refrigerated container main body includes the heat-insulating sheet covering the upper surface of the refrigerated target, the refrigerating capacity inside the refrigerated container main body can be reduced, and the cold storage efficiency can thus be improved.

In a preferred embodiment of the refrigerated container according to the present invention, the heat-insulating sheet includes on an inner surface side thereof a refrigerant holding portion adapted to hold the packaged refrigerant.

Since the heat-insulating sheet includes on the inner surface side thereof the refrigerant holding portion adapted to hold the packaged refrigerant, the packaged refrigerant can be held on the inner side of the heat-insulating sheet, and the packaged refrigerant can be prevented from movement by inclination of the refrigerated container.

In a preferred embodiment of the refrigerated container according to the present invention, a refrigeration storage method using the refrigerated container includes: laying a heat-insulating sheet on a bottom surface inside the refrigerated container main body; mounting the refrigerated target on the heat-insulating sheet; and arranging the packaged refrigerant between the refrigerated target and a heat-insulating sheet covering the refrigerated target.

With the above refrigeration storage method, since leakage of cold air from the bottom surface inside the refrigerated container main body is prevented, more efficient refrigeration is achieved.

Also, the present invention provides a method for refrigerated transportation using the refrigerated container.

A preferred embodiment of the method for refrigerated transportation according to the present invention is a method for transporting a plurality of refrigerated targets that need to be refrigerated at different temperature ranges at the same time, the method including: a refrigerated target containing process for containing the refrigerated targets classified based on the different temperature ranges in the refrigerated containers; a refrigerating treating process for containing the packaged refrigerants keeping insides of the refrigerated containers at appropriate refrigerating temperatures into the refrigerated container main bodies; and a refrigerated container arranging process for arranging the plurality of refrigerated containers subjected to the refrigerating treatment in an equal space, wherein the insides of the respective refrigerated containers are refrigerated at independent temperatures, and the refrigerated containers are transported.

With the above method, the plurality of refrigerated targets that need to be refrigerated at the different temperature ranges can be transported at the same time for a long time while keeping the refrigerated states.

In a preferred embodiment of the method for refrigerated transportation according to the present invention, the different temperature ranges are three temperature ranges of a frozen temperature, a chilled temperature, and an ordinary temperature. Since the different temperature ranges are the three temperature ranges of the frozen temperature, the chilled temperature, and the ordinary temperature, the method for refrigerated transportation according to the present invention can suitably be used for food transportation.

Also, the present invention provides a refrigerating lid covering a containing portion containing a refrigerated target, including a lid main body having a heat-insulating property and a refrigerant holding portion provided in the lid main body, wherein the lid main body is foldable so that the refrigerant holding portion may be inward.

In the refrigerating lid according to the present invention, since the lid main body is foldable so that the refrigerant holding portion may be inward, the refrigerant can be located on the inner side of the lid main body in a state in which the refrigerant is contained in the refrigerant holding portion. Thus, the refrigerating lid can be treated safely without exposing the refrigerant outward until immediately before an operation of putting the refrigerating lid.

Also, since, at the time of preparation for an operation of putting the refrigerating lid over the refrigerated target, the refrigerant held in the refrigerant holding portion is interposed by the heat-insulating lid main body without being exposed outward in the folded state, the refrigerant can be restricted from melting until immediately before an operator puts the refrigerating lid over the refrigerated target.

When the refrigerating lid is to be put over the refrigerated target, the folded lid main body is opened, and the refrigerating lid can be in a form of the refrigerating lid.

Also, in the refrigerating lid according to the present invention, since the lid main body has a heat-insulating property, the refrigerated target can be refrigerated efficiently without releasing cold air when the refrigerated target is refrigerated with use of the refrigerant.

In a preferred embodiment of the present invention, the folding is half folding.

Since the folding is the half folding, by opening the folded lid main body, the refrigerating lid can easily be put over the refrigerated target.

In a preferred embodiment of the present invention, a plurality of refrigerant holding portions are arranged on the inner side of the lid main body.

Since the plurality of refrigerant holding portions are arranged on the inner side of the lid main body, a plurality of refrigerants can be held when the refrigerated target is to be refrigerated with use of the refrigerants. Thus, the refrigerated target can be refrigerated efficiently.

In a preferred embodiment of the present invention, the refrigerant holding portion is formed in a bag shape including a plurality of ventilation holes.

With the embodiment, cold air of the refrigerant directly contacts the refrigerated target at the time of refrigerating the refrigerated target with use of the refrigerant, and the refrigerated target can thus be refrigerated efficiently.

Also, by putting the refrigerating lid in a freezer with the refrigerant contained in the refrigerant holding portion when the refrigerant has lost the refrigerating function, cold air directly contacts the refrigerant, and the refrigerant can thus be cooled efficiently.

In a preferred embodiment of the present invention, the lid main body includes a handle.

With the embodiment, the lid main body itself does not need to be gripped, the operability is improved, and the refrigerant can be treated safely and easily.

Also, in another preferred embodiment of the present invention, the lid main body includes at least two handles opposed to each other in a state in which the lid main body is folded.

With the embodiment, the operator does not need to grip the lid main body directly to carry the refrigerating lid and can carry the refrigerant while keeping the folded state.

In a preferred embodiment of the present invention, the handles are made of string materials and are formed in loop shapes.

With the embodiment, the refrigerating lid can be hung at an appropriate position inside the freezer and cooled without detaching the refrigerant from the refrigerant holding portion when the refrigerant held in the refrigerant holding portion has lost the refrigerating function. Since the refrigerating lid can be hung at the appropriate position and cooled without detaching the refrigerant from the refrigerant holding portion, a space inside the freezer can be used efficiently.

Also, in a preferred embodiment of the present invention, the refrigerant holding portion is provided with an opening through which the refrigerant is taken in and out, and the opening is opened laterally in a state in which the lid main body is hung by the handles.

With the embodiment, the refrigerant will not fall even in a state in which the refrigerating lid is hung when the lid main body containing the refrigerant, which has lost the refrigerating function, is cooled in the freezer.

Further, the present invention provides a refrigerated target packing kit adapted to refrigerate a refrigerated target and including the following components:

a) the refrigerating lid according to the present invention,
b) the refrigerated container including the containing portion containing the refrigerated target, and
c) the heat-insulating sheet provided on the bottom surface of the containing portion.

By using such a kit, packing of the refrigerated target is facilitated, and the refrigerated target can be carried and transported while keeping the refrigerated state.

Advantageous Effects of Invention

A cold-storage agent according to the present invention has high refrigerating performance. With a preferred embodiment, a temperature around −18° C. can be retained for several to several tens of hours. Also, since the cold-storage agent according to the present invention can be frozen at −22° C. to −18° C., which is a temperature range of a freezer in a household refrigerator, the cold-storage agent can be used without the need for a special refrigerating facility or the like.

Also, with a preferred embodiment, a refrigerated container according to the present invention enables refrigeration at a temperature around −18° C. for several to several tens of hours.

A refrigerating lid according to the present invention can improve operability and safety in an operation of putting the refrigerating lid over a refrigerated target. Also, when the refrigerating lid is just provided in a conventionally used containing box for food transportation or the like, a high refrigerating effect can be obtained.

Also, with a preferred embodiment, a method for refrigerated transportation according to the present invention enables refrigeration at a temperature around −18° C. for several to several tens of hours. Thus, long-distance transportation can be achieved without using a cooling device.

BRIEF DESCRIPTION OF DRAWINGS

FIG. 1 illustrates a rear surface and a front surface of a refrigerating lid according to an embodiment.

FIG. 2 illustrates a lid main body in a folded state.

FIG. 3 illustrates the lid main body of the refrigerating lid in a hung state.

DESCRIPTION OF EMBODIMENTS

Figure 4:
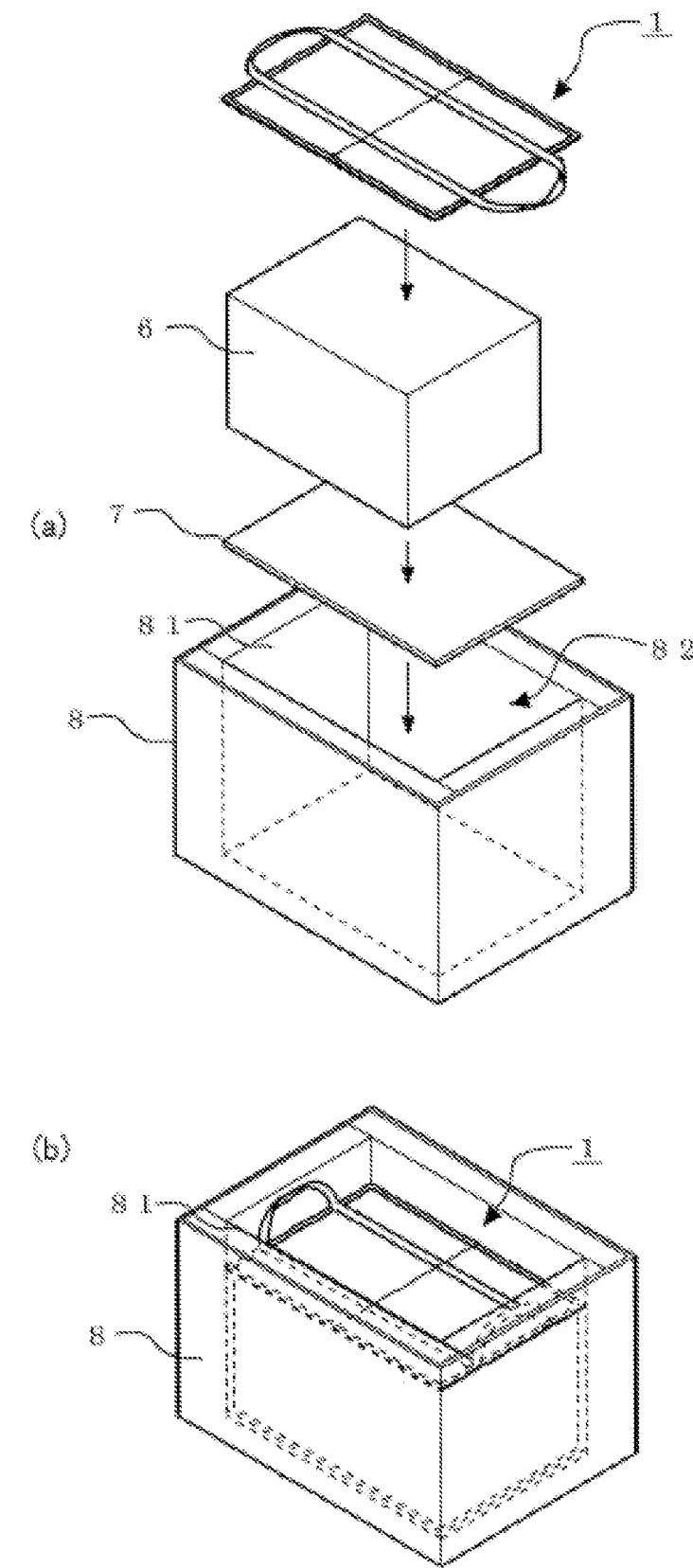
FIG. 4 illustrates a use state of the refrigerating lid.

Hereinbelow, embodiments of the present invention will be described in detail.

A cold-storage agent according to the present invention contains water, ammonium chloride, potassium chloride, and sodium sulfate, and the content of ammonium chloride, potassium chloride, and sodium sulfate satisfies the following Formula (1):

$$1.0 < \text{ammonium chloride}/(\text{potassium chloride} + \text{sodium sulfate}) < 5.0 \quad \text{Formula (1)}$$

The value of Formula (1) is preferably lower than 4.0, more preferably lower than 3.0, further preferably lower than 2.5, still further preferably lower than 2.0, and most preferably lower than 1.7.

The lower limit value is preferably higher than 1.2 and more preferably higher than 1.4.

In a case in which the ratio of each component satisfies the above condition, retention time at a low temperature can be extended while restricting supercooling. The low temperature in this context is preferably around −18° C., more specifically −22° C. to −15° C., and preferably −22° C. to −17° C. The reason for this is that the cold-storage agent can be frozen by a facility corresponding to a freezer in a household refrigerator. For example, the retention time at about −17.5° C. can be eight hours or longer. In a preferred embodiment, the retention time can be ten hours or longer, and more preferably twelve hours or longer.

The content of ammonium chloride is preferably 10.0 to 30.0 mass %, more preferably 10.0 to 25.0 mass %, further preferably 12.0 to 22.0 mass %, still further preferably 15.0 to 20.0 mass %, and most preferably 18.0 to 20.0 mass %.

The content of ammonium chloride can be selected in the above range in accordance with the targeted cooling retention temperature and time.

The content of potassium chloride is preferably 1.0 to 15.0 mass %, and more preferably 2.5 to 12.0 mass %.

The content of sodium sulfate is preferably 1.0 to 15.0 mass %, and more preferably 2.0 to 12.0 mass %.

The total content of potassium chloride and sodium sulfate is preferably 5.0 to 20.0 mass %, and more preferably 5.5 to 16.0 mass %.

As described in the following examples, the larger the total content is, the more the cooling time tends to be extended. Accordingly, the total content can be selected in the above range in accordance with the targeted cooling retention temperature and time.

The total content of ammonium chloride, potassium chloride, and sodium sulfate is preferably 15.0 to 40.0 mass %, more preferably 18.0 to 35.0 mass %, and further preferably 20.0 to 35.0 mass %.

The content of water is preferably 60.0 to 85.0 mass %, more preferably 65.0 to 82.0 mass %, and further preferably 65.0 to 80.0 mass %.

The cold-storage agent according to the present invention can be produced by mixing the essential components in an ordinary method. The cold-storage agent according to the present invention may also be provided with an arbitrary component such as a thickener unless the effect of the present invention is lost.

The cold-storage agent according to the present invention can be packaged in a package and used as a packaged refrigerant for food preservation and the like. The cold-storage agent according to the present invention is particularly suitable for use in preservation of a frozen food such as ice cream. The cold-storage agent according to the present invention is promising as an alternative refrigerant to dry ice. As the package, one that is normally used for a refrigerant, such as a plastic package, can be used without particular limitation.

The present invention also provides the packaged refrigerant including the cold-storage agent according to the present invention and the package packaging the cold-storage agent.

Hereinbelow, an embodiment of a refrigerated container according to the present invention will be described in detail.

The refrigerated container according to the present invention is a container adapted to keep a refrigerated target at an appropriate refrigerating temperature and includes a refrigerated container main body having a heat-insulating property and the packaged refrigerant contained in the refrigerated container main body.

Hereinbelow, an embodiment according to the present invention will be described, and it is to be understood that a technical scope of the present invention is not limited to the embodiment.

The shape of the refrigerated container main body is not particularly limited and may be any shape as long as the refrigerated container main body can contain a refrigerated target.

Also, the material and structure of the refrigerated container main body are not particularly limited as long as the refrigerated container main body has a heat-insulating property. In a case in which the refrigerated container main body has a heat-insulating property, the refrigerated target can be refrigerated efficiently without releasing cold air when the refrigerated target is refrigerated with use of the refrigerant.

Also, in a preferred embodiment of the refrigerated container according to the present invention, the refrigerated container includes on an inner surface thereof a refrigerant holding portion adapted to hold the packaged refrigerant. With the refrigerated container according to the present invention, at the time of transporting the refrigerated container, the packaged refrigerant contained therein is prevented from moving to one side of the refrigerated container.

The shape and structure of the refrigerant holding portion are not particularly limited as long as the refrigerant holding portion can hold the refrigerant, and the shape thereof can be a box shape, a tubular shape, or a bag shape, for example. The refrigerant holding portion is preferably formed in a bag shape including a plurality of ventilation holes.

Also, the number of the refrigerant holding portions is not particularly limited. The number of the refrigerant holding portions provided in the refrigerated container main body may be one, two, or more.

Also, the refrigerated container according to the present invention may include a heat-insulating sheet covering the upper surface of the refrigerated target.

In a case in which the refrigerated container according to the present invention includes the heat-insulating sheet covering the upper surface of the refrigerated target, the spatial capacity to be cooled can be reduced, and the cooling efficiency can thus be improved.

The planar shape, size, and thickness of the heat-insulating sheet are not particularly limited as long as a space to contain the refrigerated target is left. Also, the heat-insulating sheet preferably includes on an inner surface side thereof a refrigerant holding portion adapted to hold the packaged refrigerant.

In the refrigerated container according to the present invention, it is preferable to lay a heat-insulating sheet on a bottom surface inside the refrigerated container main body, mount the refrigerated target on the heat-insulating sheet, and arrange the packaged refrigerant between the refrigerated target and another heat-insulating sheet covering the refrigerated target.

Also, the refrigerated container according to the present invention is preferably in a form of using a refrigerating lid.

Hereinbelow, an embodiment of the refrigerating lid according to the present invention will be described, and it is to be understood that a technical scope of the present invention is not limited to the embodiment.

A refrigerating lid 1 according to the present embodiment illustrated in FIGS. 1 to 4 includes a lid main body 2 having a heat-insulating property, a folding line 3 provided on the lid main body 2, a refrigerant holding portion 4, and handles 5 (FIG. 1).

The lid main body 2 will be described below with reference to FIG. 1.

In the present embodiment, the lid main body 2 is formed in a rectangular shape. In a case in which the lid main body 2 is formed in the rectangular shape, the refrigerating lid 1 can be put over a refrigerated target 6 provided through an opening portion 82 of a rectangular-solid-shaped refrigerated container 8 conventionally used in food storage and can cover the opening portion 82 (refer to FIG. 4). However, the planar shape of the lid main body is not particularly limited and may be any shape such as a quadrangle such as a square, a rectangle, a trapezoid, and a rhombus, a triangle, a circle, and an oval.

In the present embodiment, the lid main body 2 is made of a material having a heat-insulating property and flexibility. Specifically, the lid main body 2 is made of a flexible composite sheet including a foamable resin layer between two aluminum metalized sheets. However, the material and structure of the lid main body are not particularly limited as long as the lid main body has a heat-insulating property. In a case in which the lid main body has a heat-insulating property, the refrigerated target can be refrigerated efficiently without releasing cold air when the refrigerated target is refrigerated with use of the refrigerant. Also, in a case in which the lid main body is flexible, the refrigerating lid 1 can easily be deformed and can easily be put over the refrigerated target 6 through the opening portion 82 of the refrigerated container 8 (refer to FIG. 4(b)).

The lid main body 2 includes the folding line 3 passing the middle line of the lid main body 2 as illustrated in FIG. 1 and can be folded in half so that, as illustrated in FIG. 2, the refrigerant holding portion 4 in a state of containing a refrigerant X (FIG. 2(a)) may be inward (FIG. 2(b)).

In a case in which the refrigerating lid 1 is in such a folding structure, the folded lid main body can easily be opened, and an operator can thus put the refrigerating lid over the refrigerated target easily.

However, the folding method and structure of the lid main body are not particularly limited as long as the lid main body can be folded with the refrigerant holding portion inward. One lid main body may be folded, or two lid main bodies may foldably be connected by a connecting portion such as a clamp. In a preferred embodiment, one lid main body is folded.

Also, the folding position and the folding number of times of the lid main body are not particularly limited as long as the refrigerant holding portion provided in the lid main body is inward in a folded state, in other words, as long as the refrigerant holding portion is not exposed outward.

Since the lid main body is in a foldable configuration, the operator can perform an operation and a preparation in a state in which the lid main body is folded with the refrigerant inward until immediately before the operator puts the refrigerating lid over the refrigerated target. Thus, the operator can safely perform the operation without the refrigerant exposed outward. Also, since, at the time of the preparation for an operation of putting the refrigerating lid over the refrigerated target, the refrigerant held in the refrigerant holding portion is interposed by the heat-insulating lid main body without being exposed outward in the folded state, the refrigerant can be restricted from melting until immediately before the operator puts the refrigerating lid over the refrigerated target.

In the present embodiment, the handles 5 are made of string materials, are formed in loop shapes, and are respectively provided on two end sides of the lid main body 2 parallel to the folding line 3. The handles 5 are provided at opposed positions from each other in the folded state of the lid main body 2 (FIG. 2(b)).

Since these handles 5 are provided at the opposed positions from each other in the folded state of the lid main body 2, one can grip the handles 5 in the folded state of the lid main body 2 and can easily carry the refrigerating lid without the refrigerant X exposed outward.

Also, since the handles are made of string materials and are formed in loop shapes, the refrigerating lid can be hung inside a freezer when the lid main body including the refrigerant, which has lost the refrigerating function, is cooled inside the freezer. Thus, the refrigerant can be cooled efficiently. Also, since a vacant space in the freezer for the refrigerated target such as a food is used, a cooling space inside the freezer can be used efficiently.

Meanwhile, the lid main body according to the present invention is not always required to include the handles. Also, the position, number, structure, and material of the handle are not particularly limited as long as the handle can be gripped by hand and enables the lid main body to be lifted up.

Hereinbelow, the refrigerant holding portion 4 will be described with reference to FIG. 1.

In the present embodiment, two refrigerant holding portions 4 are provided. Accordingly, at the time of refrigerating the refrigerated target with use of the refrigerant X, the refrigerated target can be refrigerated efficiently. However, the number of the refrigerant holding portions is not particularly limited and may be one, two, or more. Two or more refrigerant holding portions are preferably provided.

Also, in the present embodiment, each of the refrigerant holding portions 4 is made of a net-like material and is formed in a bag shape.

In this manner, since the refrigerant holding portion 4 has a plurality of ventilation holes, cold air of the refrigerant directly contacts the refrigerated target at the time of refrigerating the refrigerated target with use of the refrigerant X, and the refrigerated target can thus be refrigerated efficiently.

However, the shape of the refrigerant holding portion is not particularly limited as long as the refrigerant holding portion can hold the refrigerant and can be a box shape, a tubular shape, or a bag shape, for example.

Also, in the present embodiment, the refrigerant holding portion 4 has an opening portion 41 allowing the refrigerant X to be inserted therein.

The refrigerant holding portion 4 has a hook-and-loop fastener 42 enabling the opening portion 41 to be closed in a state of inserting the refrigerant X. Thus, the refrigerant can be prevented from falling during a packing operation or when the refrigerating lid 1 is put in the freezer in a state of having the refrigerant X to cool the refrigerant X (refer to FIG. 3(b)).

More specifically, as illustrated in FIG. 3, in a state in which the lid main body 2 is hung as illustrated in FIG. 3(b), for example, the opening portion 41 through which the refrigerant X is taken in and out faces laterally. Since the opening portion 41 faces laterally, the refrigerant X will not fall even in a state in which the refrigerating lid 1 is hung.

Hereinbelow, a method for using the refrigerating lid 1 according to the present embodiment will be described with reference to FIGS. 2 to 4.

The refrigerating lid 1 is cooled in the freezer in a state of holding the refrigerant X in the refrigerant holding portion 4. The refrigerating lid 1 having the cooled refrigerant X is move to a place for the packing operation in the folded state (FIG. 2(b)) and is left in this state until immediately before the packing operation.

In the packing operation, as illustrated in FIG. 4(a), for example, a heat-insulating sheet 7 is placed on the bottom surface of a containing portion 81 through the opening portion 82 of the refrigerated container 8 including the containing portion 81, the refrigerated target 6 is contained over the heat-insulating sheet 7, and the refrigerating lid 1 according to the present invention is placed on the upper surface of the refrigerated target 6. At this time, by using the refrigerating lid 1 so as for the refrigerating lid 1 to mostly contact the refrigerated target 6 in manner of a drop lid, the spatial capacity to be cooled can be reduced, and the cooling efficiency of the refrigerated target 6 can thus be improved.

As the container, an arbitrary container such as a conventionally-used foldable shipping container and an expanded polystyrene or plastic box can be used.

Meanwhile, the refrigerated container 8 preferably includes a lid (not illustrated) closing the opening portion 82 in consideration of a viewpoint of improving the refrigerating effect and the necessity to pile the refrigerated containers in a transportation vehicle and a storage warehouse.

Also, the heat-insulating sheet 7 is not always required.

Also, by combining the refrigerating lid 1 with at least either the refrigerated container 8 or the heat-insulating sheet 7, a refrigerated target packing kit can be provided.

Hereinbelow, an embodiment of a method for refrigerated transportation according to the present invention will be described in detail.

In the method for refrigerated transportation according to the present invention, the refrigerated container is used.

In the method for refrigerated transportation according to the present invention, the transportation means and transportation device are not particularly limited as long as the method is a method for transporting the refrigerated target.

Also, the number, size, and shape of the refrigerated container to be loaded in the transportation device are not particularly limited as long as those are in the range of enabling the transportation.

With the method for refrigerated transportation according to the present invention, a plurality of refrigerated targets that need to be refrigerated at different temperature ranges can be transported at the same time.

Hereinbelow, an embodiment according to the present invention will be described, and it is to be understood that a technical scope of the present invention is not limited to the embodiment.

A transportation method according to the present embodiment is a method for performing a refrigerated target containing process for containing the refrigerated targets classified based on the different temperature ranges in the refrigerated containers, a refrigerating treating process for containing packaged refrigerants keeping insides of the refrigerated containers at appropriate refrigerating temperatures into the refrigerated container main bodies, and a refrigerated container arranging process for arranging the plurality of refrigerated containers subjected to the refrigerating treatment in an equal space, to refrigerate the insides of the respective refrigerated containers at independent temperatures and transport the refrigerated containers.

Hereinbelow, each of the processes will be described in detail.

In the embodiment of the transportation method according to the present invention, in the refrigerated target containing process, the refrigerated targets are classified based on the refrigerating temperatures of the refrigerated targets, and the refrigerated targets classified based on the different temperature ranges are contained in the different refrigerated containers, respectively. At this time, the plurality of refrigerated targets having an equal refrigerating temperature may collectively be contained in one refrigerated container.

Subsequently, in the refrigerating treating process, the packaged refrigerants each keeping the inside of the refrigerated container at the appropriate refrigerating temperature are contained into the refrigerated container main bodies.

Subsequently, the refrigerated containers subjected to the refrigerating treating process and refrigerated at the different temperature ranges are arranged in the same space such as a loading platform of a vehicle. Even when the refrigerated containers refrigerated at the different temperature ranges are arranged in the same space, each of the insides of the refrigerated containers is refrigerated at the independent temperature. Thus, the refrigerated targets that need to be refrigerated at different temperature ranges can be transported at the same time.

At this time, since the packaged refrigerant according to the present invention is used, the packaged refrigerant enables refrigeration at a temperature around −18° C. for several to several tens of hours. Thus, long-distance transportation can be achieved without using a cooling device.

Also, the classification preferably includes three temperature ranges of a frozen temperature, a chilled temperature, and an ordinary temperature. In a case in which the classification includes three temperature ranges of the frozen temperature, the chilled temperature, and the ordinary temperature, vegetables that need to be transported at the ordinary temperature, drinking water that need to be transported at the chilled temperature, and processed food that need to be transported at the frozen temperature can be transported at the same time without using a cooling device while keeping the refrigerated states at the respective temperature ranges.

EXAMPLES

Packaged refrigerants packaging cold-storage agents having composition (the remaining amount is water) shown in Table 1 were prepared. The packaged refrigerants were cooled in a constant temperature chamber (PR-2KPH manufactured by ESPEC Corp. in the possession of Yamanashi Prefecture Fuji Industrial Experimental Station) set at −20° C., and whether or not the samples were frozen after twenty four hours was determined. As for Samples Nos. 1 and 2, whether or not the samples were frozen after the samples were cooled at −18° C. for twenty four hours was confirmed.

Figure 5:
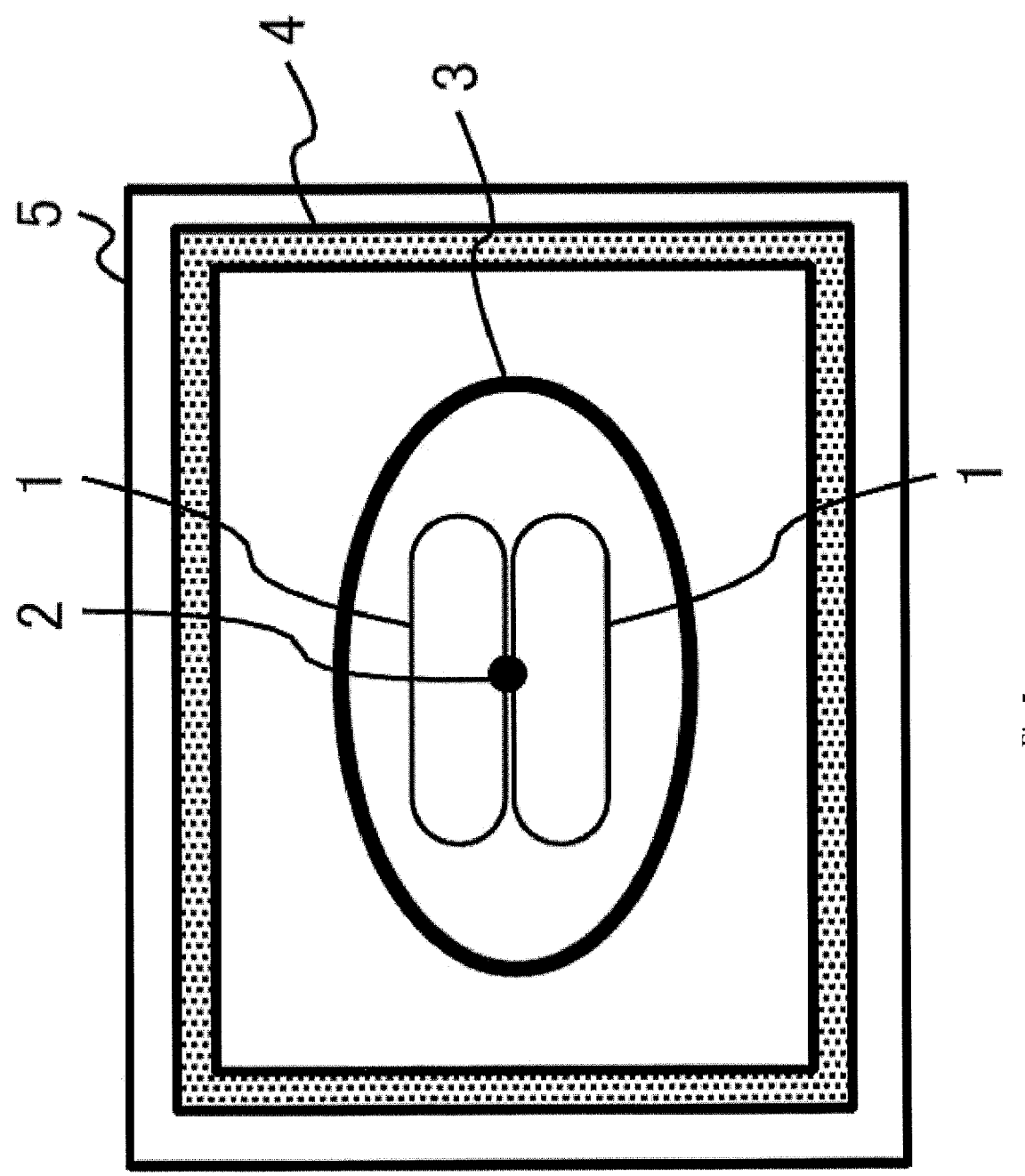
FIG. 5 is an experiment configuration diagram according to the present embodiment.

Two frozen packaged refrigerants 1 as a pair were covered with a heat-insulating Miramat 3 in a state in which a temperature sensor 2 is provided between the two packaged refrigerants 1 as illustrated in FIG. 5. The Miramat 3 covering the packaged refrigerants 1 was stored in a heat-insulating box 4 having a heat-insulating property and made of expanded polystyrene. The heat-insulating box 4 was stored in a cardboard box 5. The cardboard box 5 was stored in a sealed experiment chamber the temperature of which was set and kept at 30° C., and the temperature change was measured by the temperature sensor 2. That is, the low-temperature retaining performance of the packaged refrigerant was evaluated in the experiment environment simulating an environment in which the outside temperature was 30° C.

Table 1 shows freezability at −20° C. and time for which the temperature of −17.5° C. was retained.

TABLE 1

| Sample No. | Ammonium chloride (mass %) | Potassium chloride (mass %) | Sodium sulfate (mass %) | Potassium chloride + sodium sulfate (mass %) | Total (mass %) | Ammonium chloride/ (potassium chloride + sodium sulfate) | Freezability | Retention time (hour) |
|---|---|---|---|---|---|---|---|---|
| 1 | 12.5 | 3.7 | 2.1 | 5.6 | 16.2 | 2.2 | Yes | 6 |
| 2 | 12 | 4 | 2 | 6 | 16 | 2.0 | Yes | 9 |
| 3 | 16 | 1 | 3 | 4 | 17 | 4.0 | Yes | 9 |
| 4 | 19 | 4 | 3 | 7 | 23 | 2.7 | Yes | 10.5 |
| 5 | 19 | 5 | 2 | 7 | 24 | 2.7 | Yes | 10.5 |
| 6 | 19 | 10 | 4 | 14 | 29 | 1.4 | Yes | 12 |
| 7 | 19 | 10 | 5 | 15 | 29 | 1.3 | Yes | 13 |
| 8 | 19 | 6 | 3 | 9 | 25 | 2.1 | Yes | 10.5 |
| 9 | 19 | 5 | 3 | 8 | 24 | 2.4 | Yes | 11.5 |
| 10 | 19 | 10 | 3 | 13 | 29 | 1.5 | Yes | 14 |
| 11 | 19 | 3 | 10 | 13 | 22 | 1.5 | Yes | 13 |
| 12 | 16 | 2 | 1 | 3 | 18 | 5.3 | Yes | 6 |
| 13 | 17 | 2 | 1 | 3 | 19 | 5.7 | Yes | 7 |

As shown in Table 1, every sample was completely frozen after cooling at −20° C. for twenty four hours. Samples Nos. 1 and 2 were completely frozen after cooling even at −18° C. for twenty four hours. Also, as for Samples Nos. 1 to 11, the retention time at −17.5° C. was eight hours or longer. Among these, as for Samples Nos. 4 to 11, the retention time was ten hours or longer, which was a striking effect.

It is apparent from the result that, in a case in which the content of ammonium chloride, potassium chloride, and sodium sulfate satisfies the following Formula (1), supercooling is restricted, and the packaged refrigerant is excellent in the low-temperature retaining performance.

$$1.0 < \text{ammonium chloride}/(\text{potassium chloride}+\text{sodium sulfate}) < 5.0 \quad \text{Formula (1)}$$

For example, as is apparent from comparison between Samples Nos. 1 to 3 and Samples Nos. 12 and 13, although the content of ammonium chloride and potassium chloride is equivalent, Samples Nos. 1 to 3, which satisfy the above conditions, are longer in low-temperature retaining time.

Also, in a case in which the content of ammonium chloride is approximately 10.0 to 20.0 mass %, and in which the total content of potassium chloride and sodium sulfate is 1.0 to 16.0 mass %, the packaged refrigerant is frozen at −22° C. to −18° C., which is a temperature range of a freezer in a household refrigerator. Thus, it is found that such a packaged refrigerant is useful from a practical standpoint. Accordingly, it is found that, by mixing the respective components in these ranges, the freezing temperature and the low-temperature retaining performance can be established at the same time. Specifically, it is found that the freezing temperature can be within +3° C. of a target temperature to be retained for eight hours (refrigerating temperature), for example.

It is also found that, the larger the total content of ammonium chloride and potassium chloride is, the longer the refrigerating time tends to be.

Figure 6:
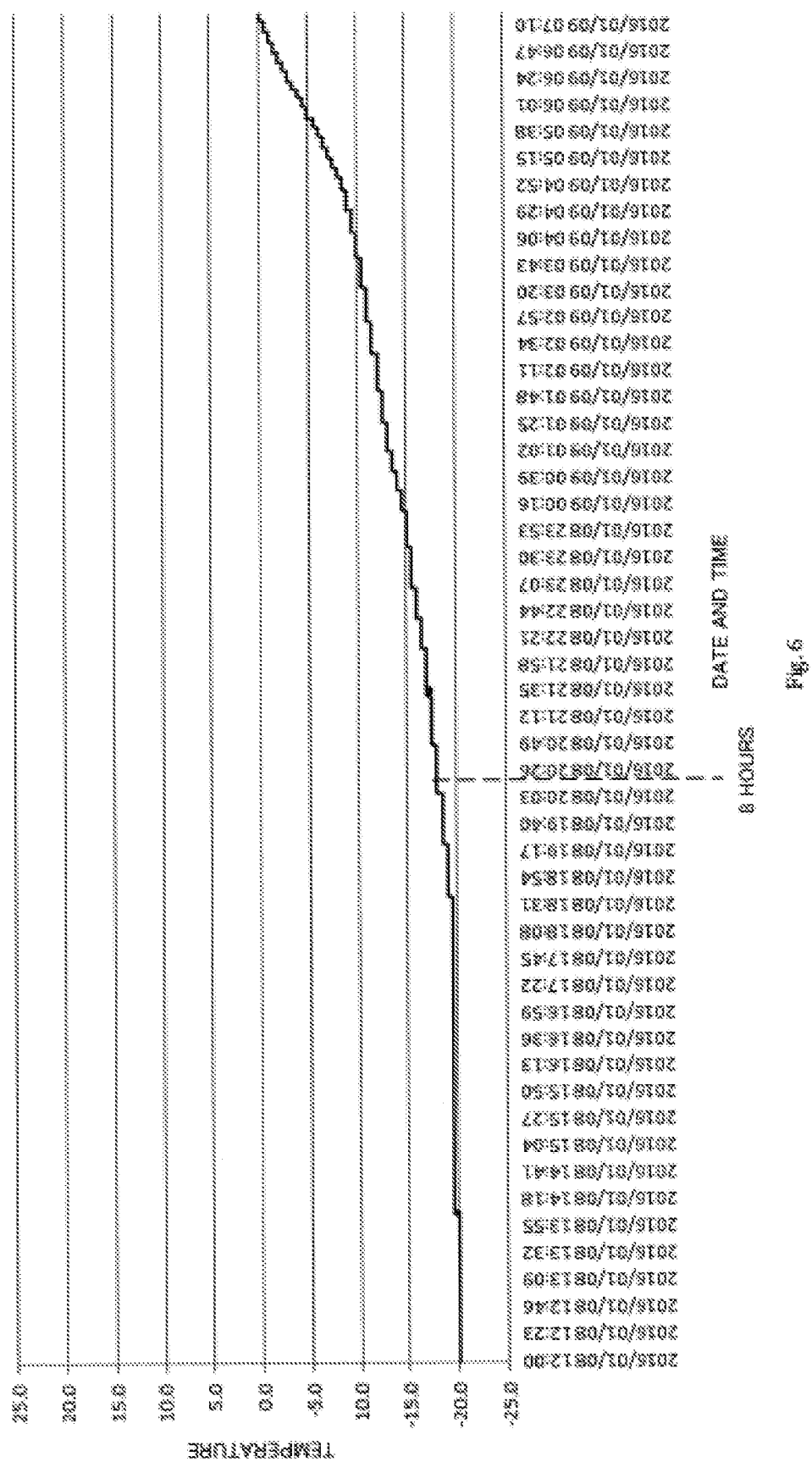
FIG. 6 is a graph illustrating measured values of temperature changes of Sample No. 5.
Figure 7:
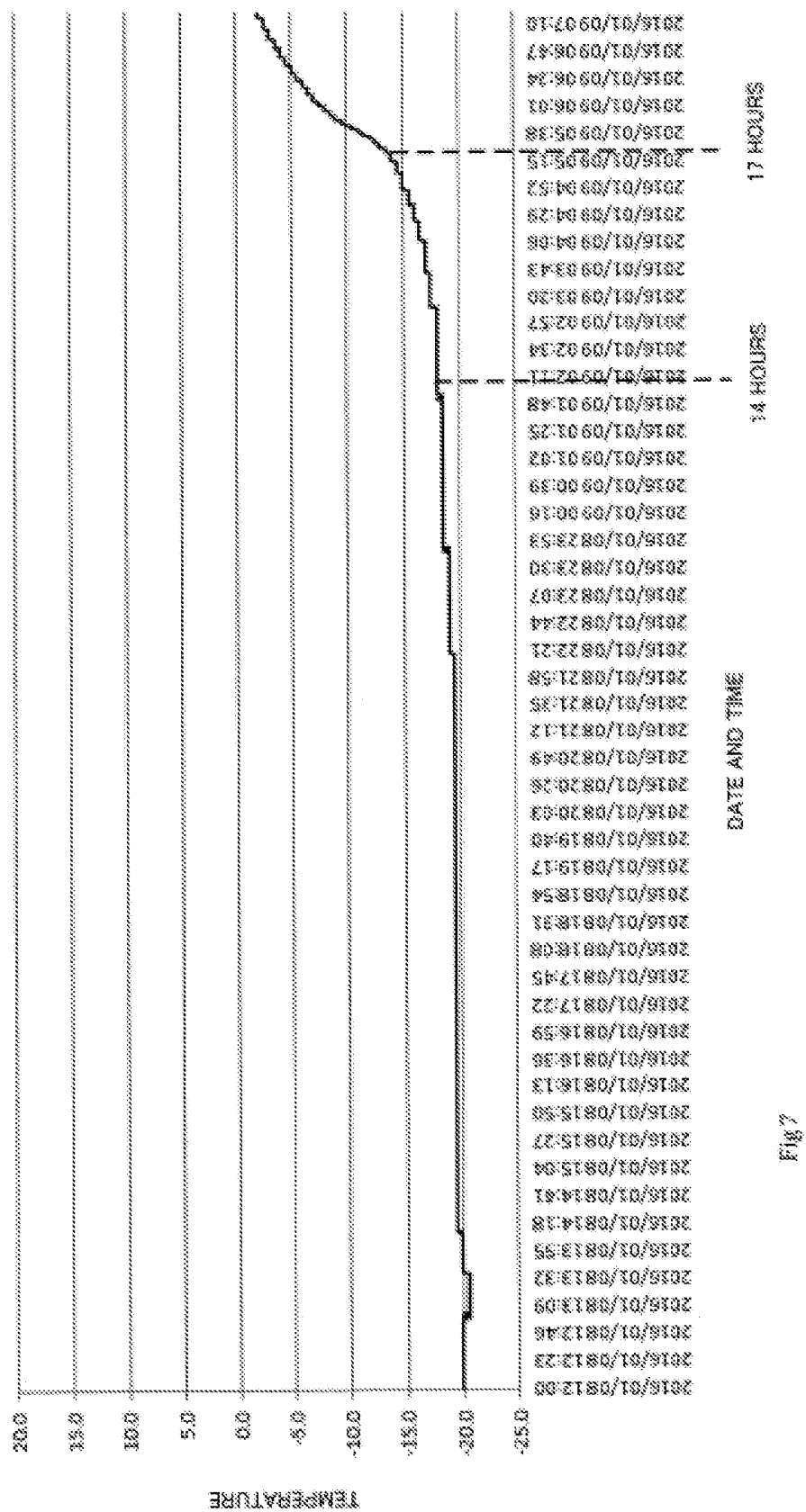
FIG. 7 is a graph illustrating measured values of temperature changes of Sample No. 10.

FIGS. 6 and 7 are graphs illustrating measured values of temperature changes of Samples Nos. 5 and 10, respectively. As is apparent from comparison of the graph in FIG. 7 with the graph in FIG. 6, in Sample No. 10, the retention time at a temperature of −18° C. or lower is relatively long, and the entire tendency differs. That is, the temperature is kept at −18° C. until the lapse of fourteen hours, changes slightly (that is, the tilt of the graph changes slightly) until the lapse of about seventeen hours, and rapidly increases after the lapse of about seventeen hours. In this manner, in the preferred embodiment of the present invention, at least within fourteen hours, no rapid temperature change occurs, and stable refrigerating performance can be secured.

INDUSTRIAL APPLICABILITY

The cold-storage agent according to the present invention can be used as the packaged refrigerant for food preservation in an aircraft.

The refrigerated container and the method for refrigerated transportation according to the present invention can be used for food preservation in an aircraft and for long-distance transportation by means of a vehicle with no cooling device.

REFERENCE SIGNS LIST 1 refrigerating lid
2 lid main body
3 folding line
4 refrigerant holding portion
41 opening portion
42 hook-and-loop fastener
5 handle
6 refrigerated target
7 heat-insulating sheet
8 refrigerated container
81 containing portion
82 opening portion
X refrigerant

The invention claimed is:

1. A cold-storage agent comprising:
   water;
   ammonium chloride;
   potassium chloride; and
   sodium sulfate,
   wherein contents of the ammonium chloride, the potassium chloride, and the sodium sulfate satisfies the following Formula (1):

$$1.0 < \text{ammonium chloride}/(\text{potassium chloride}+\text{sodium sulfate}) < 5.0 \quad \text{Formula (1)}.$$

2. The cold-storage agent according to claim 1, wherein the content of the ammonium chloride is 10.0 to 30.0 mass %.

3. The cold-storage agent according claim 1, wherein a total content of the potassium chloride and the sodium sulfate is 5.0 to 20.0 mass %.

4. A packaged refrigerant comprising:
   the cold-storage agent according claim 1; and
   a package packaging the cold-storage agent.

5. A refrigerated container adapted to keep a refrigerated target at an appropriate refrigerating temperature, the refrigerated container comprising:
   a refrigerated container main body having a heat-insulating property; and
   the packaged refrigerant according to claim 4 contained in the refrigerated container main body.

6. The refrigerated container according to claim 4 wherein the refrigerated container main body comprises on an inner surface thereof a refrigerant holding portion adapted to hold the packaged refrigerant.

7. The refrigerated container according to claim 5, comprising a heat-insulating sheet covering an upper surface of the refrigerated target.

8. The refrigerated container according to claim 7, wherein the heat-insulating sheet comprises on an inner surface side thereof a refrigerant holding portion adapted to hold the packaged refrigerant.

9. A refrigerating method using a refrigerated container, wherein the refrigerated container comprises:
   a refrigerated container main body having a heat-insulating property; and
   the packaged refrigerant according to claim 4 contained in the refrigerated container main body
   wherein the refrigerating method comprises
   laying a heat-insulating sheet on a bottom surface inside the refrigerated container main body;
   mounting the refrigerated target on the heat-insulating sheet; and
   arranging the packaged refrigerant between the refrigerated target and a heat-insulating sheet covering the refrigerated target.

10. A method for refrigerated transportation comprising:
    using the at least one refrigerated container according to claim 5.

11. The method for refrigerated transportation according to claim 10 which is a method for transporting a plurality of refrigerated targets that need to be refrigerated at different temperature ranges at the same time, the method comprising:
    a refrigerated target containing process for containing the refrigerated targets classified based on the different temperature ranges in the refrigerated containers;
    a refrigerating treating process for containing packaged refrigerants keeping insides of the refrigerated containers at appropriate refrigerating temperatures into the refrigerated container main bodies; and a refrigerated container arranging process for arranging the plurality of refrigerated containers subjected to the refrigerating treatment in an equal space, wherein the insides of the respective refrigerated containers are refrigerated at independent temperatures, and the refrigerated containers are transported.

12. The method for refrigerated transportation according to claim 11, wherein the different temperature ranges are three temperature ranges of a frozen temperature, a chilled temperature, and an ordinary temperature.

13. The cold-storage agent according claim 2, wherein total content of the potassium chloride and the sodium sulfate is 5.0 to 20.0 mass %.

* * * * *